United States Patent [19]

Nadasky et al.

[11] Patent Number: 5,848,814
[45] Date of Patent: Dec. 15, 1998

[54] SPRING SEAL

[75] Inventors: Thomas Michael Nadasky, Berlin Center; Kathleen D. Murphy, Girard, both of Ohio

[73] Assignee: General Motors Corporation, Detroit, Mich.

[21] Appl. No.: 881,861

[22] Filed: Jun. 24, 1997

[51] Int. Cl.[6] .................................................. F16L 17/025
[52] U.S. Cl. .................... 285/342; 285/26; 285/124.1; 285/319; 285/351; 285/910; 277/648
[58] Field of Search ..................................... 285/351, 910, 285/319, 342, 343, 346, 26, 124.1; 277/612, 615, 640, 649

[56] References Cited

U.S. PATENT DOCUMENTS

| | | | |
|---|---|---|---|
| 2,983,533 | 5/1961 | Tisch | 285/910 X |
| 3,045,830 | 7/1962 | Fulton | 285/346 X |
| 3,986,737 | 10/1976 | Krusche | 285/346 X |
| 4,407,516 | 10/1983 | Le et al. | 277/648 |
| 5,340,009 | 8/1994 | Vollert et al. | 277/649 |
| 5,542,717 | 8/1996 | Rea et al. | 285/910 X |
| 5,633,969 | 5/1997 | Jennings et al. | 385/62 |

*Primary Examiner*—Dave W. Arola
*Attorney, Agent, or Firm*—Cary W. Brooks

[57] ABSTRACT

A single piece seal that functions both as a seal and a spring. The single piece seal includes a central bore for receiving a communication line such as a wire or a fiber optic cable. The single piece seal also includes a first and second radial sealing ring, and at least a first axial compression portion between the first and second rings. Preferably the seal includes a second and third compression portions each extending from an outer edge of the first and second rings respectively. Each of the rings may have and radial thickness which is 25% or more greater than the radial thickness of the first axial compression portion, and each of the rings may have an axial length which is 50% or more of the axial length of the first axial compression portion. Preferably the second and third compression portions have an axial length which is at least twice that of either of the rings. Each end of the seal have tapered counter bores communicating with the central bore.

24 Claims, 2 Drawing Sheets

U.S. Patent    Dec. 15, 1998    Sheet 2 of 2    5,848,814
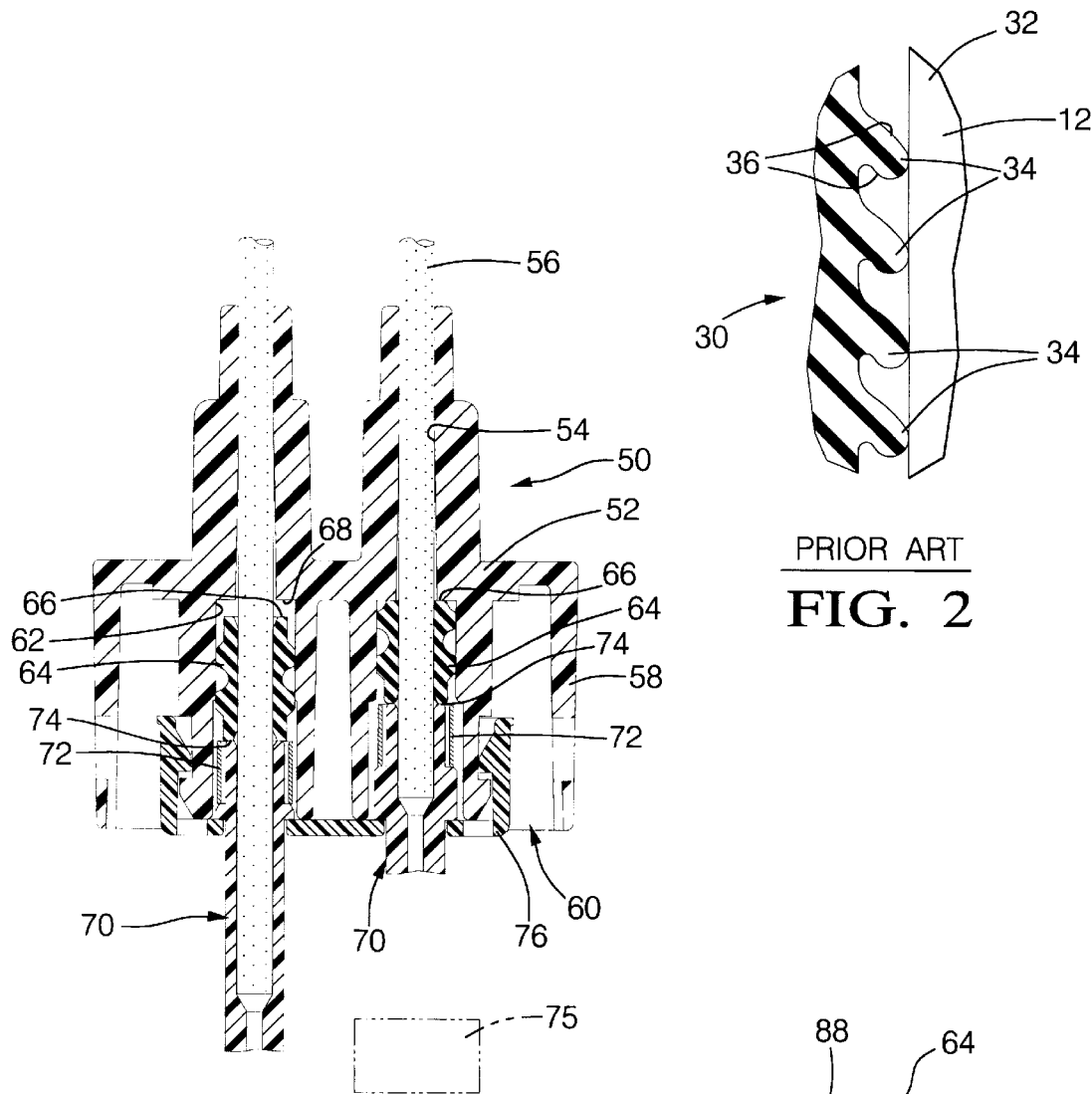
FIG. 3
PRIOR ART
FIG. 2
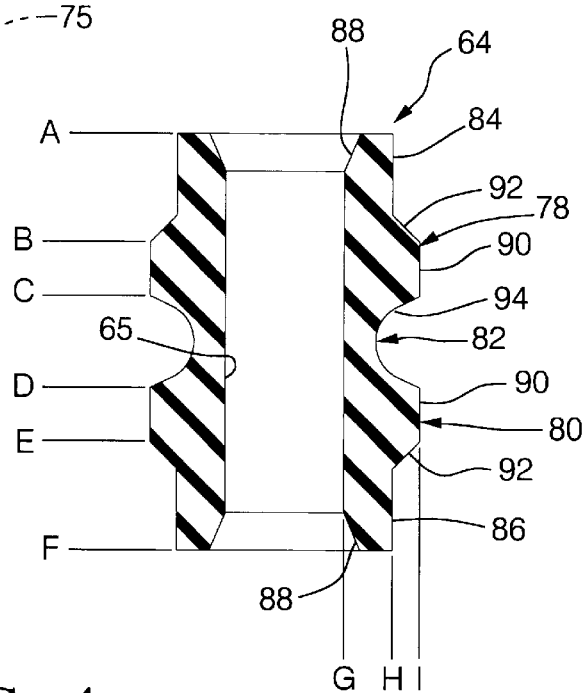
FIG. 4

SPRING SEAL

FIELD OF THE INVENTION

This invention relates to seals for communication lines such as wires and fiber optic cables, and for connector components.

BACKGROUND OF THE INVENTION

Communication lines are utilized in a variety of applications where it is desirable to seal the line from exposure to environmental elements such as water, greases, oils, fluids, and the like. In many of these applications it is also desirable to bias an end of the line towards another component so that continuous and complete contact between the end of the line and the component is maintained. This is particularly desirable for fiber optic cable lines wherein a substantial portion, or all, of the light or data being transmitted through the line can be lost if there is only a slight gap between the end of the cable and the light communicating component. This contact problem becomes acute in high vibration applications of fiber optic cables such as those in military vehicles, planes, cars, trucks, and farm equipment.

FIG. 1 illustrates a prior art fiber optic system including a first and second fiber optic line 10 extending through a first connector part 12. The end 18 of the fiber optic line has a ferrule 14 secured thereto by a crimp ring 16. The ferrule 14 and the end 18 of the fiber optic line extend through a second connector part 20 which carries a circuit board 22 having light communicating components including light receiving and/or transmitting components 24, 26 thereon such as light detectors, light emitting diodes, and circuit relays. An additional seal 28 are provided between the first and second connector parts 12, 20.

A cable seal 30 is positioned above the ferrule 14 to provide a seal along and inner face 32 of a first connector part 12 which defines the cable passage. The seal includes a plurality of spaced apart, very narrow ribs 34. As illustrated in FIG. 2, the very narrow ribs 34 fold over at the free end to engage the surface of the first connector part. When one of the very narrow ribs is folded over, both sides 36 of the ribs are bent in the same direction. Although a very narrow ribbed seal 30 provides an excellent seal against environmental exposure, the seal does not assist in biasing the ferrule and the end of the fiber optic cable towards the light communicating component. In low vibration testing, these very narrow ribbed seals 30 failed to maintain sufficient contact between the fiber optic cable and the light communicating components. A metallic coiled spring can be placed between the very narrow ribbed seal 30 and the first connector to improve the contact between the cable and the light communicating components. However, the metallic coiled spring is an additional piece, thus adding to the cost and labor to assemble the system. Further, the addition of a metallic coiled spring increases the assembly profile which waste valuable space or may not be possible in certain applications.

The present invention provides alternatives to and advantages over the prior art.

SUMMARY OF THE INVENTION

The invention includes a single piece seal that functions both as a seal and a spring. The single piece seal includes a central bore for receiving a communication line such as a wire or a fiber optic cable, or a connector component. The single piece seal also includes a first and second radial sealing ring, and at least a first axial compression portion between the first and second rings. Preferably the seal includes a second and third compression portions each extending from an outer edge of the first and second rings respectively. Each of the rings may have a radial thickness which is 25% or more greater than the radial thickness of the first axial compression portion, and each of the rings may have an axial length which is 50% or more of the axial length of the first axial compression portion. Preferably the second and third compression portions have an axial length which is at least twice that of either of the rings. Each end of the seal have tapered counter bores communicating with the central bore.

One embodiment of the invention includes a single piece seal surrounding a portion of a fiber optic cable and having one end of the seal engaging a first connector part and a second end engaging a ferrule on the end of the cable. The seal including at least one axially compressible portion to bias the end of the cable towards a light communicating component. The seal also includes first and second radial sealing rings. Preferably the seal is formed from a single piece of compressible material such as an elastomer, and more preferably from a silicone material.

These and other objects, features and advantages of the present invention will be apparent from the following brief description of the drawings, detailed description, and appended claims and drawings.

BRIEF DESCRIPTION OF THE DRAWINGS

FIG. 2 is an enlarged sectional view of a prior art very narrow ribbed seal in operation;

FIG. 3 is a sectional view of a fiber optic system utilizing a spring seal according to the present invention; and FIG. 4 is an enlarged sectional view of a spring seal according to the present invention.

DETAILED DESCRIPTION

Figure 1:
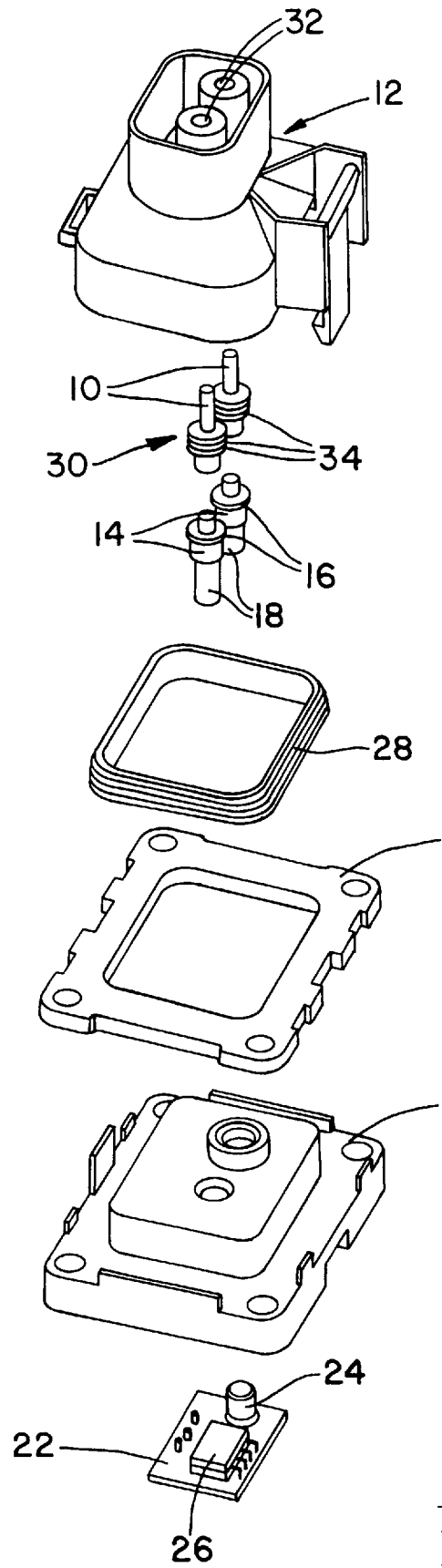
FIG. 1 is an exploded to of a prior art fiber optic cable assembly.

FIG. 3 illustrates a connector system according to the present invention including a first connector part 50 having central body portion 52 with a central bore 54 therethrough for receiving a portion of a communication line such as a wire or a fiber optic cable 56. An outer shroud 58 may surround the central body portion and a recess 60 may be provided therebetween for receiving a second connector part, not shown. The central body portion may also include a counter bore 62 for receiving a spring seal 64 surrounding the fiber optic cable 56. The spring seal 64 includes a first end 66 engaging an upper face 68 of the central body portion defining the counter bore. The upper face 68 of the central body portion acts as a pressure plate against the spring seal when the first connector part is coupled to a second connector part or other suitable element carrying a light communicating component. A ferrule 70 may also be received on the end of the fiber optic cable and secured thereto by a crimp ring 72. The spring seal 64 has a second end 74 engaging the ferrule 70 to bias the ferrule and the fiber optic cable towards the light communicating component 75 such as a light detector, light emitter or circuit relay or the like, similar to that shown in FIG. 1. A nosepiece 76 may be provided on the end of the ferrule and secured to the central body portion. The nose piece 76 functions to retain the ferrule 70 and fiber optic cable assembly against the spring seal 64.

The single piece seal according to the present invention functions both as a seal and a spring. Referring to FIG. 4, the spring seal is a single piece seal made from a compressible polymeric material such as an elastomer, and preferably a silicone material. The single piece spring seal 64 does not have any components that are coupled together to produce the dual function of sealing and biasing (acting as a spring) the cable.

Referring again to FIG. 4, the single piece seal 64 has a central bore 65 therethrough. The seal 64 also includes a first and second radial sealing ring 78, 80, and at least a first compression portion 82 between the first and second rings 78, 80. Preferably the seal includes a second and third compression portion 84, 86 each extending from an outer edge of the first and second rings 78, 80 respectively. Each of the rings 78, 80 may have a radial thickness, measured from an inner bore surface (lines G–I) to a flat engagement surface 90, which is 50% or more, preferably 60–70%, greater than the radial thickness of the first compression portion (lines G–H). Further, each of the rings 78, 80 has a portion including a flat engagement surface 90 which may have an axial length (lines B–C or lines D–E) which is 50% or more, preferably 60–80%, of the axial length of the first compression portion (lines C–D). Preferably the second and third compression portions have an axial length (lines A–B or lines E–F) which is at least twice that of either of the rings (lines B–C or lines D–E). Each end of the seal may have a tapered counter bore 88 communicating with the central bore 65. The tapered counter bores makes insertion of the cable into the seal much easier.

Each sealing ring 78, 80 has an outer engagement surface 90 which is substantially flat and parallel to the longitudinal axis of the seal. The rings 78, 80 each have an outer side wall 92 extending therefrom which preferably is formed at an acute angle to the flat engagement surface 90. Each ring 78, 80 also has an inner wall 94 extending therefrom which is curved so that an outer surface 94 of the first compression portion has an arcuate shape, which is preferably semi-circular.

In operation, the spring seal 64 is received in the counter bore 65 of the connector part 50 so that the radial sealing rings 78, 80 engage a cylindrical surface of the connector part defining the counter bore 86. The rings 78, 80 are radially compressed so that the side walls 92 of each ring deflect slightly outward in opposite axial directions to provide a good seal against the surface defining the counter bore 62. The radial sealing rings 78, 80 do not fold over like the prior art seals that have very narrow sealing ribs.

When the first connector part 50 is coupled to a second connector part or another suitable structure carrying a light communicating component 75, the ferrule 70 engages the light communicating component and the ferrule 70 and fiber optic cable 56 are biased against the light communication component 75 by the spring seal 64 which is under compression. Because the first, second, and third compression portions 82, 84, 86 are thinner than each of the radial sealing rings, these portions 82, 84, 86 of the seal compress to provide the spring action of the seal. Each of the radial sealing rings 78, 80 has a radial thickness and an axial length to prevent, or substantially limit, the axial compression of either of the rings 78, 80. A connector system constructed as described above and having a spring seal according to the present invention was able to maintain constant contact between the end of a fiber optic cable and a light communication component under severe vibration test conditions.

We claim:
1. A connector system comprising:
a pressure plate, and a spring seal that functions both as a seal and a spring, the pressure plate having a central bore therethrough for receiving a portion of a communication line, a counter bore formed in the pressure plate communicating with the central bore, the spring seal having a central bore receiving a portion of the communication line, the spring seal being received in the counter bore of the pressure plate, the spring seal comprising a single piece of polymeric compressible material and having a first and a second radial sealing ring, and at least a first axially compressible portion, the first and the second radial sealing ring each having a radial thickness greater than the radial thickness of the first axially compressible portion, and the first and the second radial sealing ring each having an axial length at least 50% of the axial length of the first axially compressible portion, and an element on the communication line providing an engagement surface, and wherein the spring seal has a first end engaging the pressure plate and a second end engaging the engagement surface and so that the first axially compressible portion biases the communication line away from the pressure plate and wherein the pressure plate and spring seal are constructed and arranged so that the radial sealing rings engage a surface defining the counter bore in the pressure plate to provide a seal by radially compressing the sealing rings and so that the sealing rings are not folded over.

2. A connector system as set forth in claim 1 wherein the communication line comprises a fiber optic cable.

3. A connector system as set forth in claim 2 further comprising a light communication component, and wherein the spring seal biases the fiber optic cable away from the pressure plate towards the light communication component to maintain continuous contact therewith.

4. A connector system as set forth in claim 2 wherein the radial sealing rings each have an outer sealing face which is substantially flat and parallel to the longitudinal axis of the spring seal.

5. A connector system as set forth in claim 4 wherein the radial sealing rings each have an outer wall extending at an acute angle to the substantially flat outer sealing face.

6. A connector system as set forth in claim 4 wherein the first axial compression portion is disposed between the first and second radial sealing rings and includes an outer arcuate shaped surface.

7. A connector system as set forth in claim 1 wherein the communication line comprises a metallic wire.

8. A connector system as set forth in claim 1 wherein the first axial compression portion is disposed between the first and second radial sealing rings, and further comprising a second and a third axially compressible portion disposed on an outer edge of the first and second radial sealing rings respectively that bias the communication line away from the pressure plate.

9. A connector system as set forth in claim 8 wherein each of the second and the third axially compressible portion each have an axial length that is at least twice the axial length of either of the first and the second radial sealing ring.

10. A connector system as set forth in claim 1 wherein the spring seal further comprises tapered counter bores communicating with the central bore of the spring seal.

11. A connector system as set forth in the claim 1 wherein the element on the communication line having an engagement surface comprises a ferrule.

12. A connector system as set forth in claim 1 wherein the pressure plate comprises a first connector part.

13. A connector system as set forth in claim 1 wherein the communication line comprises a fiber optic cable, and further comprising a second connector part carrying a light communication component, and wherein the spring seal biases the fiber optic cable away from the pressure plate for continuous contact of an end of the fiber optic cable with the light communication component.

14. A connector system as set forth in claim 13 wherein the light communication component comprises a light detector.

15. A connector system as set forth in claim 1 wherein the radial thickness of each of the first and the second radial sealing ring is at least 50% greater than the radial thickness of the first axially compressible portion.

16. A connector system as set forth in claim 15 wherein the radial thickness of each of the first and the second radial sealing ring is about 50–70% greater than the radial thickness of the first axially compressible portion.

17. A connector system as set forth in claim 15 wherein the radial thickness of each of the first and the second radial sealing ring is about 60–70% greater than the radial thickness of the first axially compressible portion.

18. A connector system as set forth in claim 1 wherein the axial length of each of the first and the second radial sealing ring is 60–80% of the axial length of the first axially compressible portion.

19. A connector system comprising:

a pressure plate, and a spring seal that functions both as a seal and a spring, the pressure plate having a central bore therethrough for receiving a portion of a connector component, a counter bore formed in the pressure plate communicating with the central bore, the spring seal having a central bore receiving a portion of the connector component, the spring seal being received in the counter bore of the pressure plate, the spring seal comprising a single piece of polymeric compressible material and having a first and a second radial sealing ring, and at least a first axially compressible portion, the first and the second radial sealing ring each having a radial thickness greater than the radial thickness of the first axially compressible portion, and the first and the second radial sealing ring each having an axial length at least 50% of the axial length of the first axially compressible portion, and an element on the connector component providing an engagement surface, and wherein the spring seal has a first end engaging the pressure plate and a second end engaging the connector component and so that the first axially compressible portion biases the connector component away from the pressure plate and wherein the pressure plate and spring seal are constructed and arranged so that the radial sealing rings engage a surface defining the counter bore in the pressure plate to provide a seal by radially compressing the sealing rings and so that the sealing rings are not folded over.

20. A connector system as set forth in claim 19 wherein each of the first and the second axially compressible portion have an axial length that are at least twice the axial length of either of the first and the second radial sealing ring.

21. A connector system as set forth in claim 19 wherein the radial thickness of each of the first and the second radial sealing ring is at least 50% greater than the radial thickness of the first axially compressible portion.

22. A connector system as set forth in claim 19 wherein the radial thickness of each of the first and the second radial sealing ring is about 50–70% greater than the radial thickness of the first axially compressible portion.

23. A connector system as set forth in claim 19 wherein the radial thickness of each of the first and the second radial sealing ring is about 60–70% greater than the radial thickness of the first axially compressible portion.

24. A connector system as set forth in claim 19 wherein the axial length of each of the first and the second radial sealing ring is 60–80% of the axial length of the first axially compressible portion.

* * * * *